No. 621,879. Patented Mar. 28, 1899.
G. A. WEST.
COMBINED TYPE WRITING AND ADDING MACHINE.
(Application filed Sept. 1, 1897.)
(No Model.) 5 Sheets—Sheet 1.

Witnesses
J. M. Witherow
Chas. E. Brock

Inventor
Gus A. West,
by Meara & Co.
Attorneys

No. 621,879. Patented Mar. 28, 1899.
G. A. WEST.
COMBINED TYPE WRITING AND ADDING MACHINE.
(Application filed Sept. 1, 1897.)
(No Model.) 5 Sheets—Sheet 2.

Witnesses
Inventor.
Gus A. West,

No. 621,879. Patented Mar. 28, 1899.
G. A. WEST.
COMBINED TYPE WRITING AND ADDING MACHINE.
(Application filed Sept. 1, 1897.)
(No Model.) 5 Sheets—Sheet 3.

Witnesses
Inventor,
Gus A. West,
Attorneys

THE NORRIS PETERS CO., PHOTO-LITHO., WASHINGTON, D. C.

No. 621,879. Patented Mar. 28, 1899.
G. A. WEST.
COMBINED TYPE WRITING AND ADDING MACHINE.
(Application filed Sept. 1, 1897.)
(No Model.) 5 Sheets—Sheet 5.

Witnesses
Inventor,
Gus. A. West,
by
Attorneys

UNITED STATES PATENT OFFICE.

GUS A. WEST, OF GILMAN, ILLINOIS.

COMBINED TYPE-WRITING AND ADDING MACHINE.

SPECIFICATION forming part of Letters Patent No. 621,879, dated March 28, 1899.

Application filed September 1, 1897. Serial No. 650,301. (No model.)

*To all whom it may concern:*

Be it known that I, GUS A. WEST, a citizen of the United States, residing at Gilman, in the county of Iroquois and State of Illinois, have invented a new and useful Combined Type-Writing and Adding Machine, of which the following is a specification.

My invention relates generally to type-writing machines, and more particularly to that class of type-writing machines in which the type with which the impressions are to be made on the paper are arranged on the peripheries of a number of disks, either separate and arranged side by side on a shaft or lever or on the periphery of a sleeve long enough to accommodate the necessary number of peripheral rows of type characters, such class being known under the general head of "type-wheel machines."

The primary object of my invention is to provide a simple, inexpensive, reliable, and durable machine of this class composed of a less number of parts than machines of the same class capable of performing the same kind of work, the reduction in the number of parts serving to render the machine easier and quieter in action and less bulky and weighty, thereby securing greater portability with greater rapidity and reliability in action.

A further object of my invention is to provide simple means whereby a type-writing machine may be combined with an adding-machine, the combined machine being readily convertible into either a type-writer or an adder, which may by simple adjustments be arranged to print upper or lower case letters and the usual numerals printed by type-writers, or to print numerals and at the same time add the numerals thereby printed, or to add the numbers indicated by the keys struck without making any impression on the paper.

With these and other objects in view my invention consists in improved mechanism for adjusting the type-sleeve longitudinally to bring the proper peripheral row of letters, numerals, or characters in line with the impression-point on the platen or paper-roll, improved mechanism for rotating the type-sleeve to bring the proper letter, character, or numeral over the impression-point, improved mechanism for locking the type-sleeve in position during the operation of making an impression, improved mechanism for preventing the axial displacement of the type-sleeve at the instant of making the impression, improved mechanism determining the degree of depression of the key-levers whereby the axial rotation of the type-sleeve is governed, improved mechanism for inking the character or type face in its downward passage to the paper at the impression-point, improved mechanism for effecting the feed motion of the platen or paper-roll during the operation of the machine, improved mechanism for varying the longitudinal feed of the platen or paper-roll, improved mechanism for governing the downward movement of the swinging carriage, improved spacing mechanism, improved means for indicating in duplicating work, improved mechanism for communicating the motion of the key-levers to the adding-machine, such motion in its regulated extent regulating the extent of the rotation of the wheels of the adding-machine, and the improved construction, arrangement, and combination of the various parts, as hereinafter fully described and afterward specifically pointed out in the appended claims.

In order to enable others skilled in the art to which my invention most nearly appertains to make and use the same, I will now proceed to describe its construction and operation, reference being had to the accompanying drawings, forming part of this specification, in which—

Like numerals of reference indicate the same parts in all the various figures of the drawings.

Referring to the drawings by numerals, 27 indicates the base upon which all the mechanism is supported. It is shown as rectangular in outline, with portions cut out to decrease the weight of the machine and accommodate parts of the mechanism. It will be understood that this base may be supported upon a stand, table, or any other fixed object when the machine is in use. Upon the base 27 are secured brackets 28, in which a rod 29 is mounted. Upon this rod 29 the key-levers 30 are pivoted, the normal position of the key-levers being inclined upward and backward. The keys 31 are mounted on the ends of bars 32, secured to the key-levers, said bars being so located with relation to each other and the various parts of the machine and of such a length as to bring the keys into the most suitable locations for the proper working of the machine. The key-levers are held at proper distances from each other at their pivotal points by separating-washers 33 on the rod 29 and are separated and guided at about their mid-length by upright separators 34, mounted on the base 27.

35 is the bar which supports the type-sleeve and its attachments. It is provided with a hub 36 at its end, mounted on the rod 29, centrally of the machine, and it extends upward and backward, being provided at its rear upper end with an upright bar or head 37, having at its upper end a sleeve 38 with a bore or opening, through which passes the shaft 39 of the type-sleeve 40, the relative size of the bore and shaft being such as will permit the shaft to slide freely.

Figures 7, 9, 10:
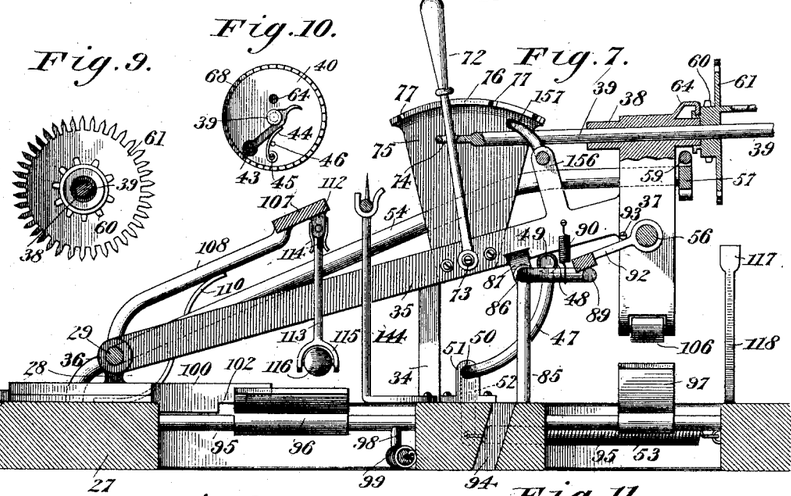
Fig. 7, Sheet 3, is an enlarged detail sectional view on the same plane as Fig. 2, indicated by broken line 2 2 of Fig. 1, the keys and some other parts being omitted.
Fig. 9, Sheet 3, is a detail sectional view taken on the plane indicated by the broken line 9 9 of Fig. 8, looking in the direction of the arrow.
Fig. 10, Sheet 3, is a view of the type-wheel in rear elevation, showing the means for securing it in position.
Figures 8, 11, 12:
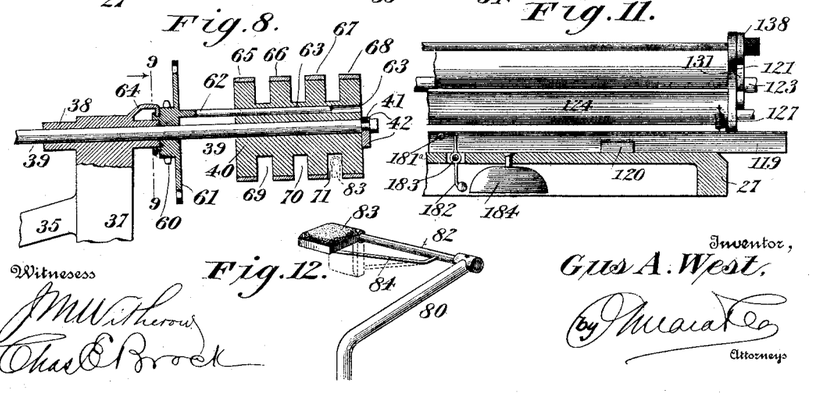
Fig. 8, Sheet 3, is a detail longitudinal sectional view, on an enlarged scale, on a vertical plane through the type-wheel and its connections.
Fig. 11, Sheet 3, is a detail sectional view on the plane cutting through the frame, indicated by the dotted line 11 11 of Fig. 1, looking in the direction of the arrow, intended to especially illustrate the bell mechanism, the carriage being shifted to the left.
Fig. 12, Sheet 3, is a detail perspective view illustrating the inking-pad and its supporting devices.

The shaft 39 at its end is provided with a circumferential groove 41, in which a pawl 42, pivoted at 43 to the end of the type-sleeve 40, is normally held by a spring 44, secured to the end of the type-sleeve by a screw 45 and limited in its outward movement by a stop 46. This mechanism is illustrated in detail in Figs. 8 and 10.

The bar 35 and all of its connections and attachments are normally supported in their upper positions by the curved rod 47, having a friction-roller 48 on its upper horizontal end 49 to bear against the under side of the bar 35, the rod 47 being part of a short shaft 50, journaled in a bracket 51, secured to the base, the downwardly-depending end 52 of said shaft passing into a recess in the base and being connected to one end of a spring 53, secured at its opposite end to the base and exerting its power to hold the curved arm upward to support the bar 35.

54 and 55 are side bars of the main frame of the machine. They are mounted on the rod 29 and extend upwardly and rearwardly, having normally the same general inclination as the key-levers and the bar 35. Near their rear ends they are connected by the downwardly-curved bar 56, which at its center passes through the head 37 of the bar 35, whereby the rods 54 and 55 are supported. At the extreme rear end of the bar 54 is pivoted a transverse flat bar 57, having projecting lugs 58 at its ends, in which are journaled the pintles of an idler-roller 59, upon which the rear ends of the key-levers strike when depressed, the object being to lessen friction.

Journaled on the shaft 39 of the type-sleeve, immediately adjacent to the end of the sleeve 38, are a sprocket-wheel 60 and a toothed wheel 61, which is denominated the "centering-wheel," the two being shown as formed integrally, and a stem 62 projects rearwardly from the wheel 61, parallel with shaft 39, into a longitudinal bore or passage 63 of the type-sleeve, being freely slidable therein, whereby the sprocket-wheel, centering-wheel, and type-sleeve are caused to rotate together. The hubs of these wheels embrace the end of the sleeve 38 and are provided with a circumferential groove, in which engages the end of a spring-bar 64, secured to the sleeve 38, this arrangement permitting of the free rotation of the wheels and type-sleeve, but preventing their accidental endwise displacement. (See Figs. 7 and 8.)

The letters, characters, and numerals to be printed are arranged in parallel rows around the periphery of the type-sleeve 40, four rows being used in this instance, marked 65, 66, 67, and 68, the several rows being separated by circumferential grooves 69, 70, and 71 in the type-sleeve, the effect being the same as though the type-sleeve were composed of four disks carrying type on their peripheries and separated by washers. In the construction shown row 67 is to be capital or upper-case letters, row 68 small or lower-case letters, row 66 numerals and characters usually used in type-writing, and row 65 numerals to be used when the machine is operated as a combined type-writing and adding machine, as hereinafter described.

As is usual in type-wheel machines, means must be provided to adjust the type-sleeve longitudinally to bring the desired row of type to the impression plane. This mechanism in this instance consists of a hand-lever 72, pivoted at 73 to the bar 35 and passing through a loop or ring 74, formed in the front end of shaft 39 of the type-sleeve. By oscillating this lever forward and backward the type-sleeve shaft and the type-sleeve are moved longitudinally to any desired position within the limit of oscillation of the lever. To hold the lever at any adjustment, I provide a vertical plate 75, secured to and projecting above the bar 35 and having a curved flange 76 on its upper edge normally held in contact with the lever 72, notches 77 being cut in this flange in which the lever will be seated and held, the first notch from the front of the machine being positioned to hold the lever when row 65 is adjusted to working position and the others positioned to perform the same function for rows 66, 67, and 68.

Figure 5:
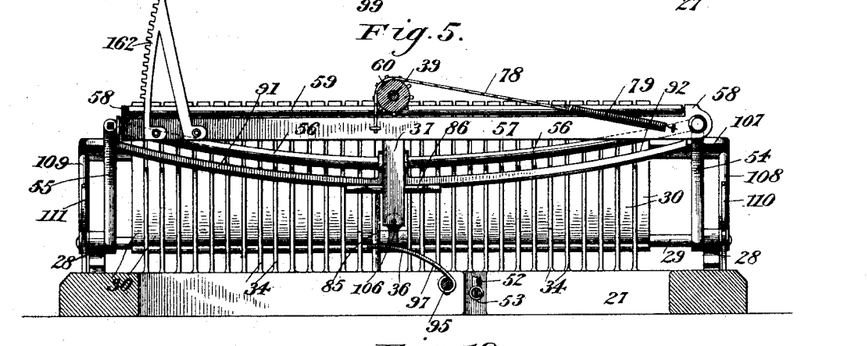
Fig. 5, Sheet 2, is a similar view on the plane indicated by the broken line 5 5 of Fig. 1, looking in the direction of the arrows, parts being omitted to avoid confusion.
Figure 6:
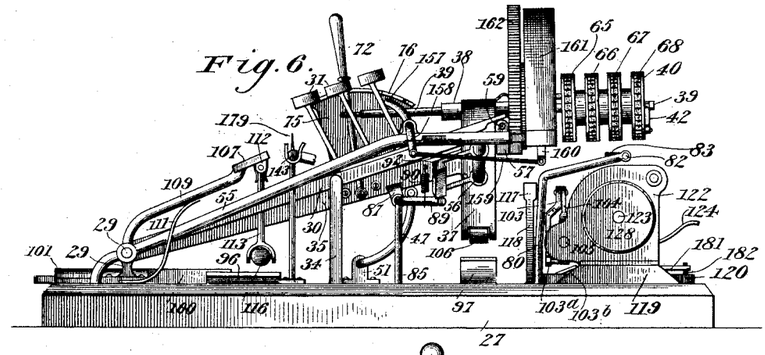
Fig. 6, Sheet 3, is a view in elevation of the right-hand end of the machine as illustrated in Fig. 1.

To the bar 57 is secured one end of a sprocket-chain or punctured metal ribbon 78, which passes up over the sprocket-wheel 60 and thence to the right, as illustrated in Fig. 5, the right-hand end being connected to a spring 79, secured at its opposite end to the bar 57.

80 is a bar rigidly secured to the base 27, projecting rearwardly to a position above the platen or roll 81, upon which the paper to be printed on is placed, and being provided with a horizontal arm 82, lying parallel to the paper-roll and to the impression plane. On the end of this arm 82 is pivotally secured an inking-pad 83, held normally in a horizontal position immediately above the impression-point by a spring 84, secured to the arm 82 at one end and having its other end bearing against the under side of the inking-pad.

The mechanism herein described is for the purpose of performing the functions of adjusting the type-sleeve longitudinally to bring the proper row of type into the impression plane, and then by the partial depression of a key to bring the proper character or type in the positioned row of type over the impression-point and ink the type. The downward movement of the key and key-lever, carrying the frame and type-sleeve with it, cannot be completed to make the impression on the paper for the reason that it is stopped by a bar 85 or "lock," as I term it, which projects downwardly from a horizontal bar or shaft 86, journaled in brackets 87 on the bar 35 and provided with horizontal crank-arms 88 and 89, projecting rearwardly and laterally, being held in normal position by a spring 90, connecting the crank-arm 89 with the bar 35.

Upon the curved bar 56 are pivotally secured, on each side of the bar 35, trippers 91 and 92, the tripper 91 resting normally on the crank-arm 88 of the stop-bar 85 and tripper 92 on the crank-arm 89, the trippers and crank-arms being prevented from rising above their normal positions under the influence of the spring 90 by means of stops 93, projecting from the sides of the head 37 of the bar 35.

94 is a hole in the base, into which the stop-bar 85 drops when tripped.

Figure 13:
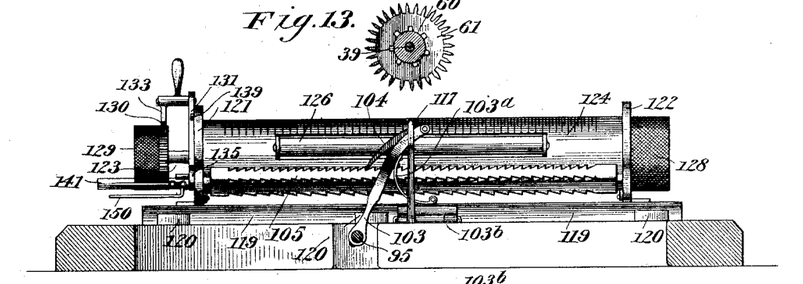
Fig. 13, Sheet 4, is a transverse vertical section on the plane indicated by the broken line 13 13 of Fig. 1, looking in the direction of the arrow, the counting mechanism being omitted.
Figure 14:
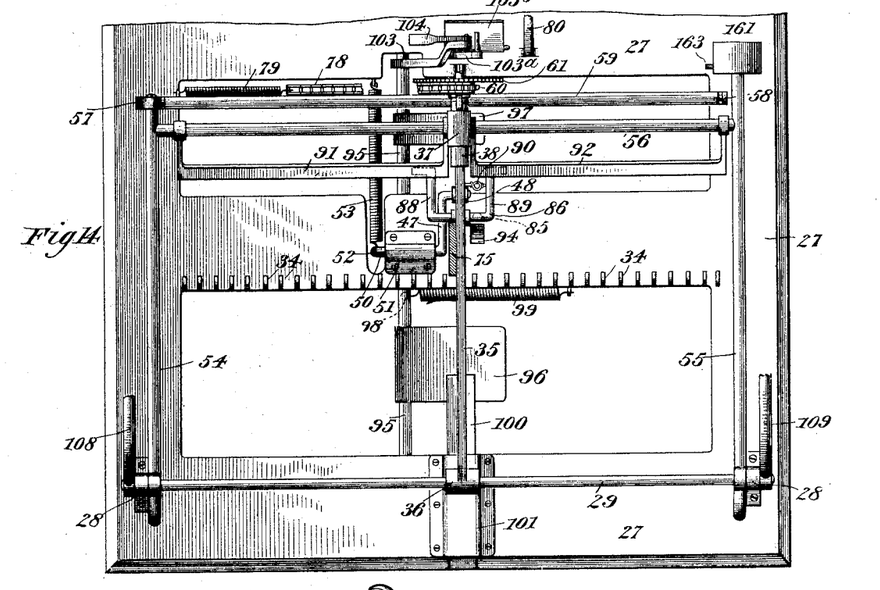
Fig. 14, Sheet 4, is a plan view of the type-writer with the keys removed.
Figures 15, 16, 17:
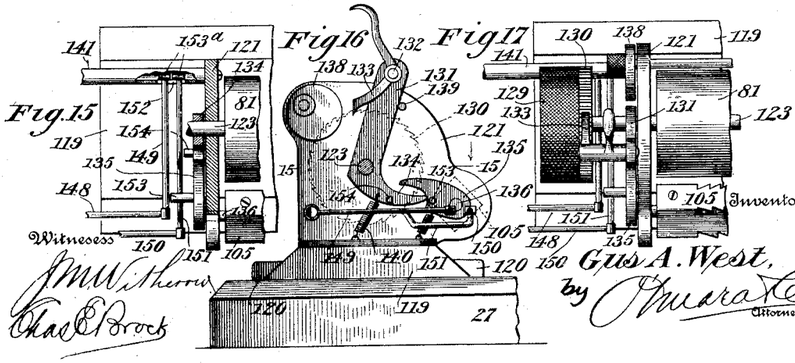
Fig. 15, Sheet 4, is a detail sectional view on the horizontal plane indicated by the broken line 15 15 of Fig. 16, looking downward, as indicated by the arrow, parts being broken away.
Fig. 16, Sheet 4, is a detail view illustrating in elevation the left-hand end of the carriage, certain parts being broken away, the ratchet-wheel for rotating the platen being shown in dotted lines.
Fig. 17, Sheet 4, is a detail view illustrating in plan the left-hand end of the carriage.
Figure 18:
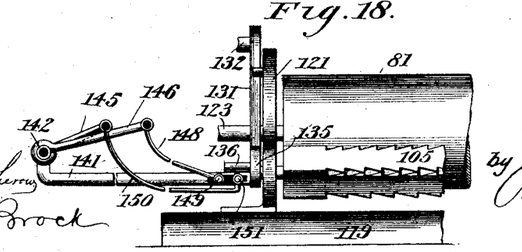
Fig. 18, Sheet 2, is a detail view illustrating in front elevation the left-hand end of the carriage.
Figure 19:
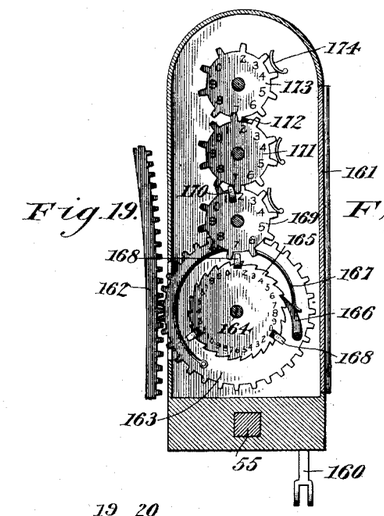
Fig. 19, Sheet 5, is a detail sectional view on a vertical plane through the adding-machine, indicated by the broken line 19 19 of Fig. 21, the actuating-rack being also shown.
Figure 20:
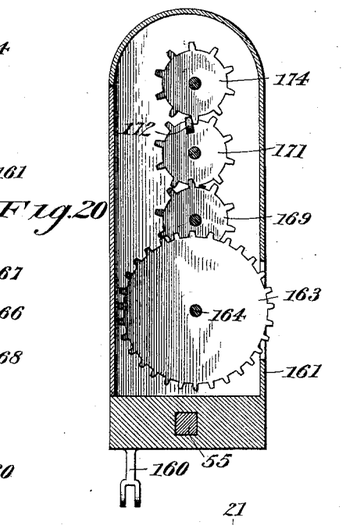
Fig. 20, Sheet 5, is a detail sectional view on the vertical plane through the adder, indicated by line 20 20 of Fig. 21.

The continued downward movement of the key and key-lever after adjusting the type-sleeve and inking the type will press the trippers 91 and 92 downward, depressing the horizontal crank-arms 88 and 89, rotating the bar or shaft 86, and carrying the lock or bar 85 into position to drop into the hole 94, so that it will offer no impediment to the further downward movement of the various parts. Secured to the rear face of the pawl-lever 103 is a curved spring 103$^a$, which when the pawl-lever is moved to the right, as illustrated in Fig. 13, will bear down upon a brake-plate 103$^b$, pivoted to the base 27 of the machine and resting upon the base 119 of the paper-carriage. By this means all tendency to move the paper-carriage backward with the pawl-lever is obviated.

95 is a rod or shaft journaled in the base 27 and lying longitudinally of the machine in recesses in the base. Plates or leaves 96 and 97 are rigidly secured to the shaft 95, the shaft being provided with a downwardly-projecting arm 98, to which is secured one end of a spring 99, the opposite end of which is attached to the base 27, the tendency of said spring being to turn the bar in a direction to hold the leaves 96 and 97 in their uppermost positions. This normal upward movement is limited by a stop-plate 100, which slides in ways 101, secured to the base 27, the under rear portion of the stop-plate being formed with a series of steps 102, either of which may be brought in position over leaf or plate 96 by adjusting the stop-plate in its ways, whereby the leaves 96 and 97 are permitted to move normally upward a varying distance under the influence of the spring 99 before being stopped by coming in contact with one of the steps of plate 100.

On the rear end of the shaft 95 is an upwardly-projecting arm 103, to the upper end of which is hinged a gravity-pawl 104, which operates the ratchet-bar 105. When an impression is made, the downward movement of the carriage causes a friction-roll 106 on the lower end of the head 37 to come in contact with and press the leaf 97 downward, causing the shaft 95 to be partially rotated, which will cause the pawl 104 to be moved one space to the right to engage a tooth in the ratchet spacing-bar, so that when the shaft 95 is rotated in the opposite direction by the action of spring 99 on leaf 97 the pawl will move the spacing-bar one step to the left, bringing another portion of the paper to the impression-point to receive the next impression.

The extent of rotation of shaft 95, and consequently through this mechanism the extent of the movement of the paper, is regulated by the height to which the leaf 96 is allowed to move upward by the stepped plate 100, as before explained, the return rotation of the shaft being effected by the spring 99.

107 is the spacing-bar to move the paper along independent of the key-levers. It is secured on the rear ends of the bars 108 and 109, pivotally secured to the rod 29 outside of the brackets 28, and held normally above the frame by springs 110 and 111. Lugs 112 depend from the spacing-bar 107, and pivotally attached to them is a bar 113, depending therefrom between guide-plates 114. The lower end of this bar 113 is forked at 115, and in the prongs is pivoted a spherical friction-roller 116. When the spacing-bar is depressed, this roller comes in contact with the leaf 96, depressing it, and, through the connections before described, moving the paper a space at a time without depressing the key-levers.

When the type-sleeve descends to make an impression, the proper centering of the character to be impressed on the paper is accomplished, just in advance of the impression, by a knife-edge guide 117, mounted on the top of a standard 118, secured to the base 27, said guide entering the space between two of the teeth of the wheel 61, and if the type is descending slightly out of alinement it will be correctly positioned, the teeth of the wheel 61 being equal in number and correspondingly arranged with relation to the characters in each row on the type-sleeve to produce this result.

119 is the base of the paper-carriage, which is mounted to slide laterally on the base 27, being prevented from being displaced by guide-pieces 120, which are secured to the base 27 and embrace or overlap its edges. On the base 119 are standards 121 and 122, in which is journaled the shaft 123 of the platen or paper roll 81.

A guard-plate 124 partially encircles the platen 81, being pivotally secured to the inside of the standards 121 and 122 by screws passing through lugs 125. In a slot in this curved guard-plate 124 is pivoted a roller 126, which normally bears against the platen and holds the paper thereon, but permits it to be moved freely under the roll, the normal position of the roll being maintained by a spring 127, connecting the guard-plate at a point on the opposite side of the pivots with the base 119 of the carriage.

The shaft 123 of the platen projects beyond the standards 121 and 122 at each end and is provided on its right-hand end with a milled wheel 128 for turning it by hand. On its left-hand end it is provided with a milled wheel 129, a short section of the circumference of which is provided with teeth 130, forming it into a ratchet-wheel.

Pivoted on the shaft of the platen, immediately adjacent to the standard 121, is a lever 131, having a bar 132 projecting from it, parallel with the shaft, outward to the vertical plane of the ratchet-teeth 130, where a gravity-pawl 133 is pivotally attached to it, having its lower end engaging the teeth and its upper end formed as a handhold. Below its pivot the lever 131 is provided with a toe 134, which has a bearing under the rear end of a plate 135 on the projecting end of a shaft 136, to which the ratchet-bar 105 is secured, said shaft being journaled in the standards 121 and 122 and projecting through 121.

The ratchet-bar 105 is square in cross-section and has ratchet-teeth formed at each of its angles, the length of the teeth being varied to give a different spacing as desired. Between the teeth are four plain sides, as shown. The ratchet-bar is adjustable on its shaft to bring either set of teeth into play by a set-screw 137. The lever 131 when moved backward will cause the pawl 133 to rotate the platen in that direction, the extent of such movement being regulated by a disk-stop 138, pivoted eccentrically to the standard 121, the return movement of the lever being limited by a stop 139, projecting from the standard, such return movement being effected by a spring 140. After a line has been printed and the paper is to be moved by rotating the platen the space of a line the lever 131 is pressed backward, when the pawl 133 will rotate the platen and the toe 134 will rotate the ratchet-bar 105, so as to bring one of its smooth sides under the pawl 104, when the platen may be freely longitudinally moved in either direction. The movement of the platen longitudinally is also effected by other means, comprising a rod 141, pivotally secured in the standard 121 and extending laterally therefrom, when it is bent at right angles and extends at 142 in an inclined position forward until it reaches a point slightly in the rear of the spacing-bar 107, where it is again bent at right angles and extends at 143 across the machine, adjacent to and in the rear of the spacing-bar, where it is supported in the open upper ends of forked standards 144, leaving it free to be lifted out of the standards or slid along in them.

On the part 142 of the rod 141 are pivoted two bails 145 and 146, the bail 145 resting above the bail 146 and both held normally raised by a spring 147, secured to the rod-section 142 and bearing upward under the bail 146. A rod 148, pivotally secured on the bail 146, projects inwardly toward the end of the platen and has at its inner end an arm 149, at right angles, extending rearwardly and fitted to slide longitudinally in the rear rod-section 141, (which is hollow,) but so that when the rod is turned the arm will be raised. A similar rod 150 is pivotally secured to the bail 145 and has a similar right-angled arm 151, correspondingly arranged with relation to the rear rod-section 141. Each of the arms is shown as passing into a slot 152 in the rod 141 and provided with a head 153$^a$ inside the rod too large to pass through the slot. When the operator places his thumb under the rod-section 143, which crosses the key-levers, and his forefinger on the bail 145, and while pressing down on the bail raises the rod-section 143 off its supports, the downward pressure on the bail will cause the rod 150 to move inward and the arm 151 to take a position under a pin 153, projecting from the plate 135, and the raising of rod-section 143 at the same time will cause the arm to move the pin up, turning the plate 135 and the ratchet-bar 105, so as to disengage the pawl 104 from the teeth and to cause it to rest on a plain side, whereby by moving the rod-section 143 laterally the carriage may be moved freely in either direction. When, however, in taking hold of the rod-section 143 and lifting it out of its supports the operator presses down on the bail 145, he will cause the bail 146 to be moved in the same manner and with the same results as just described and will also cause the bail 145 to press rod 148 inward, causing arm 149 to take a position under a pin 154, projecting from the pawl-lever 131, and the raising of the rod-section 143 will raise the arm 149, causing it to raise the pin 154 and turn the pawl-lever 131 on its pivot, turning the platen and of course the paper the width of a line and leaving it free to be moved in either direction.

155 (see Fig. 7) is a short shaft or rod journaled or pivoted in a bracket 156, raised on the bar 35, the upper arm 157 of which stands in the path of the shifting lever 72 in its movement between the third notch 77 and the last rear one. The lower arm 158 of rod 155 is connected by a link 159 with a lug 160, depending from the casing 161 of an adding-machine mounted to slide on the rear end of the rod 55. When the shifting lever 72 is moved to the rear notch 77, bringing the rear row 65 of type into the impression plane, it will press the arm 157 backward and the arm 158 forward, and consequently, through the connecting-link 159, draw the casing 161 of the adding-machine forward, causing the teeth of a segmental rack 162, mounted on the bar 57, to engage the teeth of a wheel 163 of the adding-machine, which project through one side of the casing. This wheel 163 is the first of the train in the adding-machine, and is the units-wheel. It has in this instance thirty teeth and is loosely mounted on a shaft 164, which carries a ratchet-wheel fast on the shaft, the teeth of which are engaged by a pawl 166, mounted on the wheel 163 and normally held in engagement by a spring 167. As the wheel 163 by one revolution would move the ratchet-wheel the space of thirty teeth, said ratchet-wheel is provided with three equidistant pins or teeth 168, which engage in rotation the ten teeth of the tens-wheel 169, moving it one space for ten unit movements. The tens-wheel 169 has a single tooth 170 to engage the hundreds-wheel 171 once in a revolution of the tens-wheel, and the hundreds-wheel 171 has a single tooth 172 to engage the thousands-wheel 173 once in each revolution of the hundreds-wheel.

A curved spring 174, bearing against the teeth of the thousands-wheel 173, acts as a brake and holds the train of wheels in any position to which they are moved. The casing of the adding-machine has four openings on its face, through which may be seen the result of the addition, the lower opening 175 showing units, the next opening 176 tens, the third opening 177 hundreds, and the top one 178 thousands. The numbers are on the faces of the wheels and will be changed as the operation progresses.

When the shaft 95 is brought back to its normal position after actuating the lever 103 and the pawl 104 to move the paper-carriage a space, a spring 103$^a$ on the back of the lever 103 bears against the top of a plate 103$^b$, hinged to the base 27, and presses it down on the base 119 of the paper-carriage and acts as a brake thereon to hold it in position.

Figure 1:
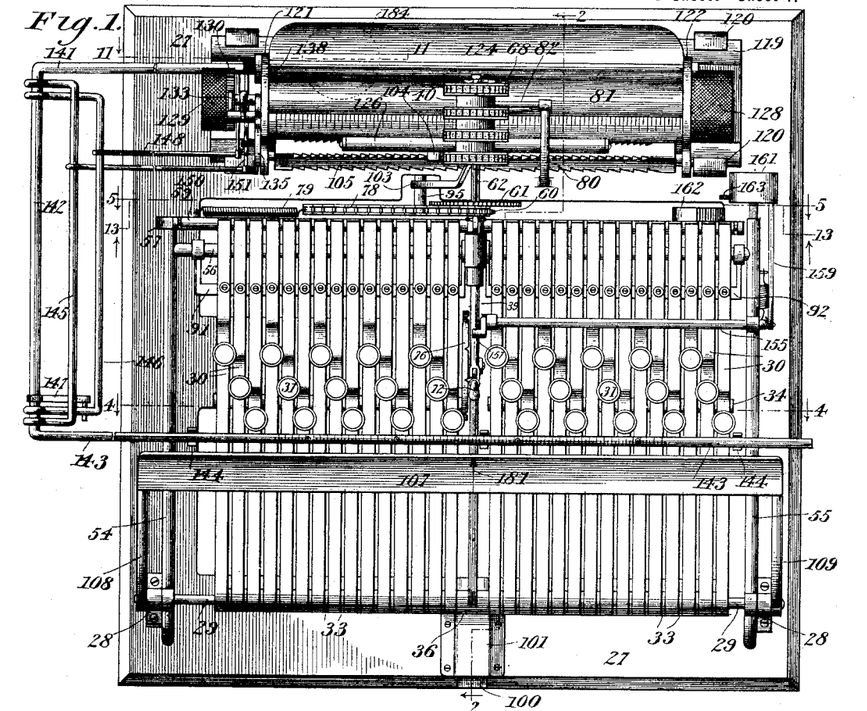
Figure 1, Sheet 1, is a top plan view of the type-writer complete.
Figures 2, 25:
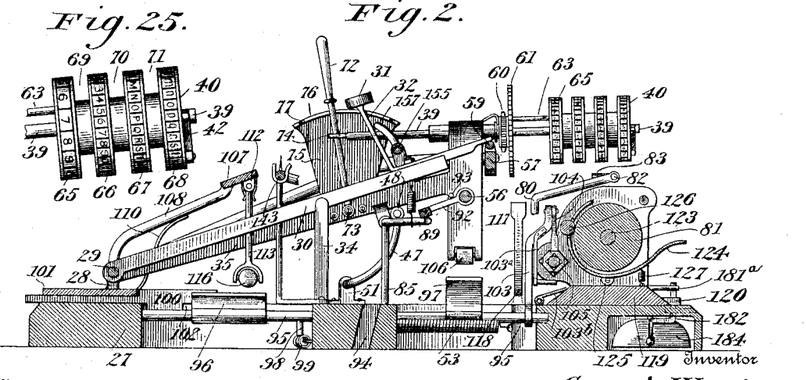
Fig. 2, Sheet 1, is a longitudinal vertical section taken on the broken line 2 2 of Fig. 1, looking in the direction of the arrow.
Fig. 25, Sheet 1, is a detail view, in side elevation, on an enlarged scale, of the type-wheel.
Figure 3:
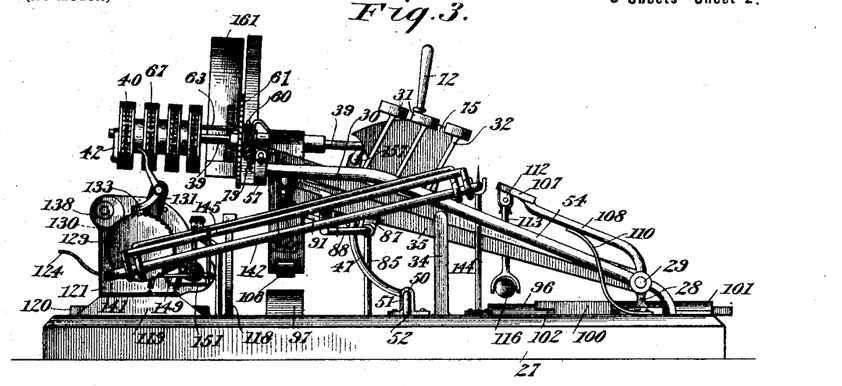
Fig. 3, Sheet 2, is a view in elevation of the left-hand end of the machine as shown in Fig. 1.
Figure 4:
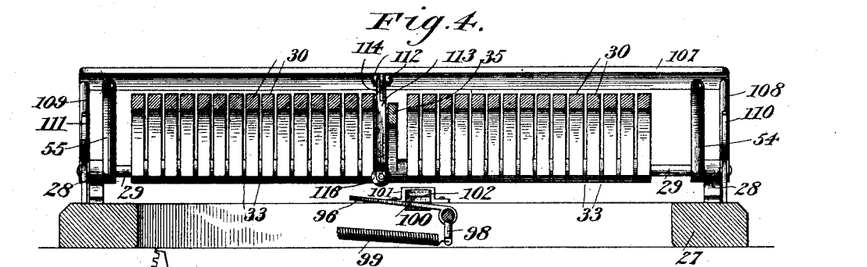
Fig. 4, Sheet 2, is a transverse vertical sectional view taken on the plane indicated by the broken line 4 4 of Fig. 1, looking in the direction of the arrows.
Figures 21, 22, 23, 24, 26:
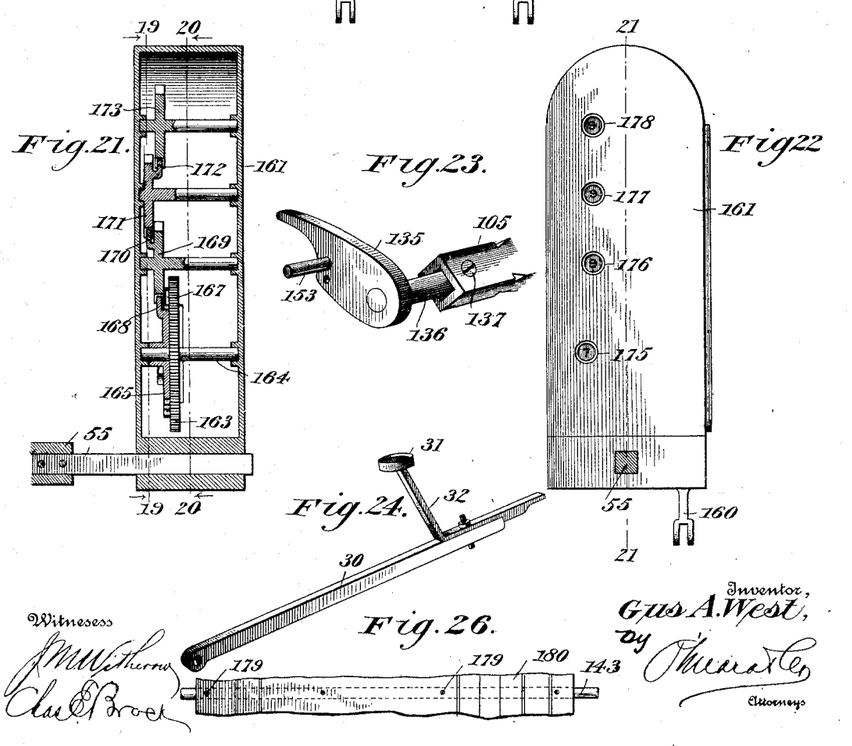
Fig. 21, Sheet 5, is a detail sectional view on the plane through the adder indicated by the broken line 21 21 of Fig. 22.
Fig. 22, Sheet 5, is a view in elevation of the indicator-face of the adder.
Fig. 23, Sheet 5, is a detail view in perspective, on an enlarged scale, of the left-hand end of the rack-bar and connections.
Fig. 24, Sheet 5, is a detail view in perspective, on an enlarged scale, of one of the keys and key-levers.
Fig. 26, Sheet 5, is a fragmentary detail view in plan illustrating the manner of securing a duplicate indicator-sheet on the machine.

Inasmuch as the rod-section 143 moves with the paper-carriage, it is utilized as a tabulator and indicator, having a graduated scale on it to correspond with the tabulated scale on the paper-guard. In Fig. 26, Sheet 5, I have shown the arrangement for utilizing it as such devices. In this figure, as in several others, it will be seen that points or stickers 179 are formed on the rod 143, and when tabulating or any other work is being done a duplicate ruled sheet, as at 180, is secured on the rod 143 by impaling it on the stickers, this duplicate sheet lying immediately in front of the spacing bar or key 107, (see Fig. 1,) upon which is a mark 181 in line with the impression-point, which mark will indicate on the duplicate sheet the exact point on the paper on the roll which will receive the next impression. A pin 181ª in a proper position on the paper-carriage comes in contact during the movement of the paper-carriage to the left with a bell-hammer 182, pivoted at 183 to the base of the machine, causing it to strike an alarm on the bell 184 just before the end of each line is reached.

A complete single operation of my invention may be described as follows: A sheet of paper having been placed upon the paper-roll under the guard-plate 124, the depression of a key-lever will cause the pivoted bar 57 to be moved on its pivot until the key-lever strikes the curved stop-bar 56. This movement of the pivoted bar 57 will pull on the sprocket-chain 78 and cause the sprocket-wheel 60 to be rotated, causing the type-sleeve to be turned to bring the character corresponding with the depressed key into the impression-line. The further movement downward of the key-lever carries the type-sleeve-supporting frame with it, the lock-bar 85 being tripped by the pressure of the trippers 91 and 92, depressing the arms 88 and 89, carrying the lock or bar 85 over hole 94, into which it will pass during the rest of the movement of the key-lever. This tripping operation will permit the key-lever and type-sleeve-supporting frame to be further depressed until the type strikes the paper on the roll. During the downward movement of the type-sleeve the type in the impression-line will strike squarely against the inking-pad 83, being thus supplied with ink. As the type passes farther downward after inking it will tilt the inking-pad 83 on its pivotal arm 82, turning the pad edgewise, so that it will pass into one of the spaces 69, 70, or 71 between the rows of type when type on series 65, 66, or 67 is used or alongside of the outer end of the type-sleeve when row 68 is used. During this downward movement of the frame the leaf 97 is depressed, which will cause the shaft 95 to be turned and the arm 103 to carry pawl 104 backward a step on the ratchet-bar of the paper-carriage to engage another tooth ready to feed the carriage along one step, when the spring 99 brings shaft 95 back to its original position. This completes a single operation, and the various parts of the machine may be adjusted and manipulated to perform all the necessary operations in the manner fully described hereinbefore, and the construction of the various parts may be as hereinbefore described.

The principal feature of the present invention—viz., the means for adjusting and connecting the type-writing and adding machines—will be readily understood from the description of their construction and operation hereinbefore given.

From the foregoing description it will be obvious that I have provided simple, accurate, and reliable means for carrying out the objects of my invention as briefly outlined in the preamble to my specification.

When the rack and the wheel of the adding-machine are brought into engagement, which cannot occur except when the row of type having numerals is in the impression plane, every downward movement of a key-lever will cause a corresponding rotation of the wheels of the adding-machine, such rotation being limited by the extent of movement of the rack with the key-lever, such movement being limited by the curved stop-bar. Should it be desired to print the numbers added, the type-sleeve will be allowed to remain on the machine; but when adding is to be done without printing the type-sleeve will be removed, but the devices by which the rear row of the type-sleeve is brought into action will be operated just the same as though the type-sleeve were not removed, this being necessary to couple the type-writing machine to the adder.

While I have illustrated and described what I believe to be the best means for carrying out my invention, I do not wish to be understood as limiting myself to the exact construction and arrangement shown and described, but hold that such slight changes and variations as might suggest themselves to the ordinary mechanic would properly fall within the limit and scope of my invention.

Having thus fully described my invention, what I claim as new, and desire to secure by Letters Patent, is—

1. A type-writing machine provided with a type-sleeve having a numeral series, in combination with an adding-machine, and connections whereby the adjustment of the numeral series on the type-sleeve into the impression plane will bring the mechanism of the adding-machine in position to be operated by the movement of the key-levers, substantially as described.

2. A type-writing machine provided with depressible key-levers, a slidable type-sleeve having a numeral series, and a frame provided with a curved rack, in combination with an adding-machine having a projecting cog-wheel, and means for bringing the numeral series on the type-sleeve, and the rack and cog-wheel, simultaneously into operative position, substantially as described.

3. A type-writing machine provided with depressible key-levers, a swinging frame and a rack on the frame depressed by the key-levers, with a bar separate from the key-lever frame, an adding-machine slidably mounted thereon, and means for drawing the adding-machine toward the rack, substantially as described.

4. A type-writing machine provided with a type-sleeve and means for longitudinally adjusting it, in combination with an adding-machine, and means for coupling it into working engagement with the type-writing machine, actuated by the type-sleeve-adjusting mechanism, substantially as described.

5. A type-writing machine provided with a type-sleeve having a plurality of rows of type on its periphery, one of said rows containing numbers, means for bringing that row into the impression plane, an adding-machine, and devices connecting the type-sleeve-adjusting mechanism with it, whereby the operating of such adjusting mechanism brings the adding-machine into operative connection with the type-writing machine, substantially as described.

6. The combination, in a type-writing machine, of depressible key-levers, a transverse bar pivoted at one end in the path of the key-levers, a curved rack-bar on said pivoted bar, adding mechanism provided with projecting cog-wheel and shifting mechanism for moving the adding mechanism into and out of engagement with the rack-bar, substantially as described.

7. The combination with a type-writing machine provided with a rotatable type-sleeve depressible key-levers, a transverse bar pivoted at one end, below and in the path of the key-levers, connections between said bar and type-sleeve for rotating the sleeve when the bar is depressed by the key-levers, and a curved rack on said pivoted bar, of adding mechanism provided with a projecting cog-wheel, and means for bringing said cog-wheel into engagement with the rack, substantially as described.

8. The combination with a type-writing machine provided with a rotatable type-sleeve, a sprocket-wheel thereon, depressible key-levers, a bar pivoted in the path of the key-levers, and a chain connecting it with the sprocket-wheel, of a curved rack on said bar, adding mechanism provided with a projecting cog-wheel, and means for bringing said cog-wheel into engagement with the rack, substantially as described.

9. The combination of a type-writing machine having a slidable type-sleeve, a shifting lever for adjusting it, and a rock-shaft having two arms one in the path of the shifting lever with a slidably-mounted adding-machine and a link connecting it with the other arm of the rock-shaft, substantially as described.

10. The combination of a type-writing machine provided with a slidable type-sleeve having a numeral series, a notched flanged plate, a pivoted shifting lever adapted to be engaged in the notches of the plate and connected to the type-sleeve, a slidably-mounted adding-machine, a rock-shaft having two arms one of which lies in the path of the shifting lever, and a link connecting the other arm of the rock-shaft with the adding-machine, substantially as described.

11. The combination in a type-writing machine, of key-levers, a bar pivotally secured at one end extending across the path of the key-levers, a type-sleeve, a sprocket-wheel rotatable therewith, a chain secured at one end to the pivoted bar and passing over the sprocket, and a spring connecting the other end of the chain to the bar, whereby the depression of the pivoted bar by the depression of the key-levers causes the sprocket to be actuated to turn the type-sleeve, substantially as described.

12. The combination in a type-writing machine, of a type-sleeve, a sprocket-wheel thereon, depressible key-levers, a bar pivoted in the path of the key-levers, a chain connecting it with the sprocket-wheel, and a curved stop-bar in the path of the key-levers, substantially as described.

13. The combination in a type-writing machine, of key-levers, a bar pivotally secured at one end extending across the path of the key-levers, and a roll journaled in said pivoted bar, substantially as described.

14. The combination in a type-writing machine, of a type-sleeve provided with rows of type separated by annular grooves, with an inking-pad arranged in the path of the type-sleeve, and means whereby the pad is tilted and passed into one of said grooves while the impression is made, substantially as described.

15. The combination in a type-writing machine, of a type-sleeve provided with rows of type separated by annular grooves, with an inking-pad pivotally supported in the path of the type-sleeve, and a spring for normally holding it in a horizontal position but permitting it to be tilted into one of said grooves while the impression is being made, substantially as described.

16. The combination in a type-writing machine, of a ratchet-bar carried by the paper-carriage, a shaft journaled in the frame at right angles thereto, an upwardly-projecting arm secured to the shaft, a pawl pivoted to the upper end of said arm and engaging the teeth of the ratchet-bar, a leaf on the shaft, a spring-supported spacing-bar lying crosswise of and above the key-levers, a bar depending pivotally from the spacing-bar, and a friction-roller in its lower end adapted to engage the leaf when the spacing-bar is depressed, substantially as described.

17. The combination in a type-writing machine, of a ratchet-bar carried by the paper-carriage, a shaft journaled in the frame, an upwardly-projecting arm secured to the shaft, a pawl for actuating the ratchet-bar pivoted to the upper end of said arm, two leaves projecting laterally from the shaft, a spacing-bar above the key-levers, a bar depending therefrom above one of the leaves, a frame depressible by the key-levers, and a vertical head thereon above the other leaf, all substantially as described.

18. The combination in a type-writing machine of a paper-roller, a polygonal ratchet-bar pivoted on its longitudinal central axis and having toothed angles and smooth faces, a plate secured to the end of the ratchet-bar, a feed-pawl for moving the paper-roller longitudinally, and a pawl for rotating the paper-roller provided with a toe to engage the plate and partially rotate the ratchet-bar whereby the feed-pawl is disengaged from the ratchet-teeth and engaged with one of the smooth faces, substantially as described.

19. The combination in a type-writing machine, of an angular ratchet-bar pivoted on its longitudinal axis on the paper-carriage having each angle formed into teeth, the teeth of each angle being of a different length and smooth sides between the toothed angles, of an actuating-pawl, and means for changing it from the toothed angles to the smooth sides during the return movement of the paper-carriage, substantially as described.

20. The combination in a type-writing machine, of a paper-carriage carrying a graduated scale, a swinging rod-frame carried by the carriage and having a rod lying in supports above and across the key-levers having a similar graduated scale, points on said rod to receive a duplicate of the paper on the roll, and a mark indicating the line of the impression-point, substantially as described.

21. The combination in a type-writing machine, of the pawl-carrying shaft, the pawl carried thereby, the base of the machine, the base of the paper-carriage, the brake-plate pivoted to the base of the machine and resting on the base of the paper-carriage, and the spring secured to the rear side of the pawl and bearing on the brake-plate, substantially as described.

22. The combination in a type-writing machine, of the paper-carriage, a frame of wire or rods pivotally secured thereto, extending laterally, forwardly, and then across the keyboard, the pawl-lever on the paper-roll shaft, the plate on the ratchet-bar shaft, two bails pivoted to the rod-frame, and connections whereby the raising of the frame will operate the pawl-lever and plate, substantially as described.

GUS A. WEST.

Witnesses:
OTTO HEISE,
WILLIAM J. DICK.